US008908498B2

(12) United States Patent
Lin et al.

(10) Patent No.: US 8,908,498 B2
(45) Date of Patent: Dec. 9, 2014

(54) BUFFER SPACE ALLOCATION METHOD AND DEVICE

(75) Inventors: Yanan Lin, Beijing (CN); Yu Ding, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 101 days.

(21) Appl. No.: 13/703,638

(22) PCT Filed: Sep. 28, 2011

(86) PCT No.: PCT/CN2011/080313
§ 371 (c)(1),
(2), (4) Date: Feb. 26, 2013

(87) PCT Pub. No.: WO2012/045265
PCT Pub. Date: Apr. 12, 2012

(65) Prior Publication Data
US 2013/0201815 A1      Aug. 8, 2013

(30) Foreign Application Priority Data

Oct. 8, 2010   (CN) .......................... 2010 1 0504827
Feb. 12, 2011  (CN) .......................... 2011 1 0036889

(51) Int. Cl.
H04L 12/56  (2006.01)
H04L 12/861 (2013.01)
H04L 12/24  (2006.01)

(52) U.S. Cl.
CPC ........ H04L 49/9005 (2013.01); H04L 41/0654 (2013.01); H04L 49/90 (2013.01)
USPC ....................................................... 370/216

(58) Field of Classification Search
CPC .................. H04L 49/9005; H04L 41/0654
USPC .................................. 370/412, 216, 252, 329
See application file for complete search history.

(56) References Cited

U.S. PATENT DOCUMENTS 8,665,720 B2 *  3/2014  Shen et al. .................... 370/235
8,724,742 B2 *  5/2014  Nimbalker et al. ........... 375/316
2008/0276147 A1 * 11/2008  Gho et al. ..................... 714/748
2010/0254328 A1 * 10/2010  McBeath et al. .............. 370/329

FOREIGN PATENT DOCUMENTS

CN    101170743 A    4/2008
CN    102076023 A    5/2011
EP    2197235 A2     6/2010
WO    2009098822 A1  8/2009

OTHER PUBLICATIONS

ISR for related PCT/CN2011/080313 mailed on Jan. 19, 2012.

* cited by examiner

*Primary Examiner* — Rasheed Gidado
(74) *Attorney, Agent, or Firm* — Ladas & Parry, LLP

(57) ABSTRACT

Disclosed are a buffer space allocation method and a device. The solution of the present invention enables the division of the buffer space in the buffer resource of a terminal equipment according to the currently configured carrier aggregation mode of the terminal equipment, so that the number of buffer spaces in the buffer can be adjusted according to the number of aggregated carriers, thereby improving the utilization rate of the buffer resource. The method is simple, easy to implement, and applicable to both FDD and TDD systems.

18 Claims, 7 Drawing Sheets

BUFFER SPACE ALLOCATION METHOD AND DEVICE

CROSS REFERENCE TO RELATED APPLICATIONS

This application is the U.S. national stage of international patent application no. PCT/CN2011/080313 filed on Sep. 28, 2011, which claims priority to Chinese Patent Application No. 201010504827.8 entitled "Buffer Space Allocation Method and Device" filed in the patent office of the People's Republic of China on Oct. 8, 2010, and to Chinese Patent Application No. 2011100368893.5 entitled "Buffer Space Allocation Method and Device" filed in the patent office of the People's Republic of China on Feb. 12, 2011, the disclosures of which are incorporated by reference herein.

FIELD OF THE PRESENT INVENTION

The present invention relates to the field of communication technology, in particular to buffer space allocation method and device.

BACKGROUND OF THE PRESENT INVENTION

LTE (Long Term Evolution) system adopts HARQ (Hybrid Auto Repeat Request) to improve the reliability of data transmission. When downlink HARQ function is enabled, terminal equipment decodes the downlink data package received. ACK (ACKnowledgement) will be fed back to base station if the decoding is correct, while NACK (Negative ACKnowledgement) will be fed back for requiring base station re-transmitting the data package if it fails.

For LTE multi-carrier system, to support the system bandwidth wider than LTE system, such as 100 MHz, a kind of frequency spectrum capable of directly distributing 100 M bandwidth, as shown in FIG. 1; a kind to aggregate the frequency spectrum distributed for current system and merge into big bandwidth to supply for the use of LTE multi-carrier system. Then the uplink and downlink carriers in the system can be configured asymmetrically, viz. user may occupy N≥1 carriers for downlink transmission and M≥1 carriers for uplink transmission, as shown in FIG. 2.

It is specified in the available standard that each carrier has independent HARQ process, viz. one transport block (TB) can only be transmitted on one carrier. When base station and terminal equipment occupy several carriers to transmit data, each carrier transmits different TB respectively.

Therein, for HARQ, under single codeword transmission mode, each process comprises one TB, while under multiple codeword transmission mode, each process comprises two TBs.

After HARQ function is enabled, the receiving end will store the TB with decoding failure in the buffer, and then decode after merging it with the version re-transmitted by the sending end.

LTE Rel-10 system specifies eight terminal equipments with different capability levels, which can support various bandwidth and buffer sizes. The higher level the terminal equipment is, the greater the corresponding buffer is. All these eight terminal equipments of different capability levels can support carrier aggregation (CA), under the premise that the total bandwidth after aggregation is not more than their processing capability.

In the procedure of realizing the embodiments of the present invention, at least the following problems existing in the current technologies were found:

In CA system, concurrent HARQ processes undergoes linear increase along with the number of aggregated carrier, and the TB numbers to be stored by corresponding receiving end increase linearly as well; however the maximum bit of each TB must be less than the maximum bit of each TB supported by terminal equipment. If the storage is classified and HARQ process is stored by following the method of LTE Rel-8, the buffer space corresponding to each TB will be greater than its maximum demand, thus causing buffer waste; on the other hand, as the concurrent HARQ process in the system increases but the maximum number of HARQ process stored in the buffer remains unchanged, it means the subsequent HARQ processes cannot be stored when the number of wrong HARQ processes exceed the upper limit of buffer, hence only ARQ (Auto Repeat Request) function can be realized, viz. merge gain of re-transmission cannot be obtained.

SUMMARY OF THE INVENTION

The embodiments of the present invention provide a buffer space allocation method and device to perform flexible buffer space division on buffer resource of the terminal equipment based on the conditions of aggregated carrier.

To achieve the above purpose, the embodiments of the present invention provide a method for allocating buffer space on the one hand, which comprises:

The terminal equipment receives configuration information in current carrier aggregation mode configured for network side equipment;

The terminal equipment divides its own bumper resource into buffer space of corresponding quantity according to current configuration information in carrier aggregation mode to store information carried by all transmission blocks with decoding failure on aggregated carrier and sent by equipment at the network side according to the carrier aggregation mode through all buffer spaces.

Besides, the embodiments of the present invention also provide a kind of terminal equipment, including:

A receiving module for receiving configuration information in current carrier aggregation mode configured by the network side equipment and aggregated carrier sent by the network side equipment according to the carrier aggregation mode;

A distribution mode for dividing its own bumper resource into buffer space of corresponding quantity according to current configuration information in carrier aggregation mode;

A storage module for storing information carried by the TB with decoding failure on aggregated carrier and sent by network side equipment according to the carrier aggregation mode received by the receiving module through all buffer spaces divided by the distribution module.

In a further aspect, the embodiments of the present invention also provide a buffer space allocation method, including:

The network side equipment receives buffer resource information sent by terminal equipment;

The network side equipment determines the scheme for dividing buffer space in buffer resource of the terminal equipment according to the configuration information in CA mode corresponding to current terminal equipment and the buffer resource information.

In a further aspect, the embodiments of the present invention also provide a kind of equipment at the network side, which comprises:

A receiving module for receiving buffer resource information sent by terminal equipment;

A determination module for determining the scheme for dividing buffer space in buffer resource of the terminal equipment according to the configuration information in CA mode corresponding to current terminal equipment and the buffer resource information.

Compared with available technology, the embodiments of the present invention have the following advantages:

The technical solution of the present invention enables the division of the buffer space in the buffer resource of a terminal equipment according to the currently configured carrier aggregation mode of the terminal equipment, so that the number of buffer spaces in the buffer can be adjusted according to the number of aggregated carriers, thereby improving the utilization rate of the buffer resource. The method is simple, easy to implement, and applicable to both FDD and TDD systems.

DETAILED DESCRIPTION OF PREFERRED EMBODIMENTS

As stated in background technology, the buffer resource allocation of the terminal equipment in the available technical solution cannot be adjusted in accordance with the conditions of carrier aggregation, and the buffer space divided is much higher than actual needs of TB, thus wasting buffer resource. Moreover, the quantity of buffer space cannot be adjusted according to the concurrent HARQ process in aggregated carrier, which results in that the information in TB may be greatly lost due to restricted quantity of buffer space.

To solve the problems existing in current technology, the embodiments of the present invention provides a method for allocating buffer space of TB on multiple aggregated carrier, to realize buffer space division according to the actual situation of concurrent HARQ process on aggregated carrier, thus improving the utilization rate of buffer resource.

Figure 1:
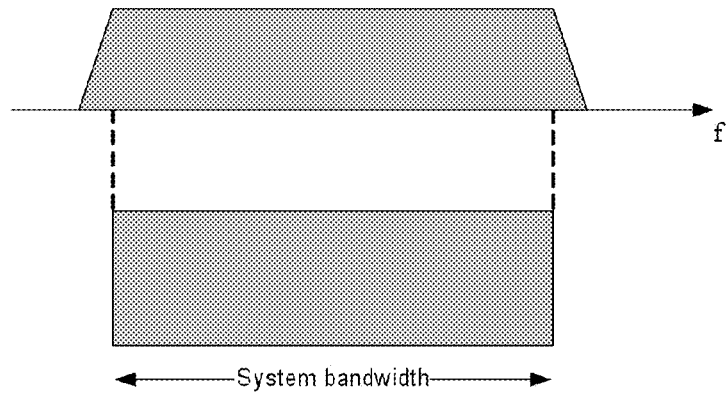
FIG. 1 is the schematic diagram of single spectrum system in current technologies.
Figure 2:
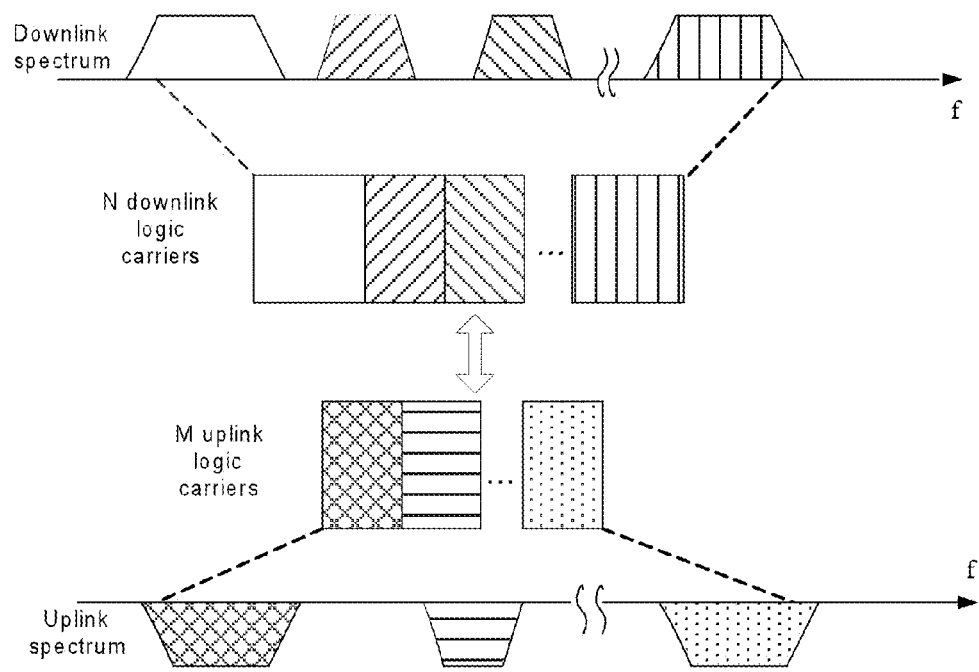
FIG. 2 is schematic diagram of spectrum aggregation system in current technologies.
Figure 3:
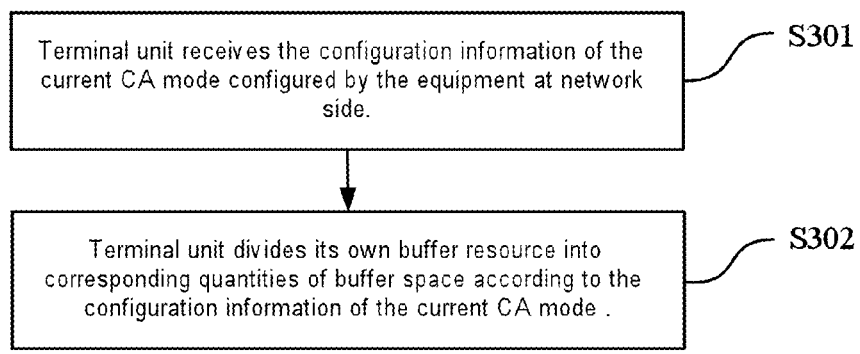
FIG. 3 is the flow diagram of a buffer space allocation method at the terminal equipment side provided in the embodiments of the present invention.

FIG. 3 is the flow diagram of a buffer space allocation method provided in the embodiments of the present invention, which comprises the following steps:

Step S301: Terminal equipment receives the configuration information of the current CA mode configured by the network side equipment.

Therein, the configuration information of CA mode at least includes:

The number of carriers aggregated by terminal equipment;

Maximum number of aggregated carrier supported by terminal equipment;

Transmission mode on all aggregated carriers corresponding to terminal equipment;

Bandwidth of all aggregated carriers corresponding to terminal equipment;

Step S302: Terminal equipment divides its own buffer resource into relevant number of buffer space according to the configuration information of the current CA mode.

In actual application scene, the division of buffer space in this step can involve the following two schemes specifically:

Scheme I: Perform Independent Buffer Space Management on Each Aggregated Carrier Respectively In this scheme, fixed storage region needs to be allocated for each aggregated carrier in buffer memory resource of terminal equipment, and the information carried in each aggregated carrier is only stored in corresponding area of the aggregated carrier.

Furthermore, the information is carried by TB in aggregated carrier, so for realizing information storage in carrier, the aforementioned storage region needs to be divided into several memory spaces, which are used to store the information carried by each TB with decoding failure in aggregated carrier.

In all embodiments of the present invention, the aforesaid storage region is named as buffer space group while the multiple storage spaces comprised in the storage area, as buffer space. In specific application, changes of the above names will not greatly impact the present invention.

It can be seen from the above explanation that for realizing the scheme, first allocate buffer space group for each aggregated carrier, and then divide them into several buffer space, so as to store the information carried in TB on corresponding aggregated carriers through buffer space.

As required by specific application scene, several processing strategies can be set for dividing buffer space group in the scheme, while in actual application, at least the following five processing strategies are included, with detailed explanations:

Processing Strategy I: Divide the Buffer Space Averagely Based on the Quantity of Aggregated Carriers.

The terminal equipment divides buffer space group of the same size for all aggregated carriers corresponding to CA mode in its own buffer resource and divides each buffer space group into relevant buffer space according to the number of the TBs on the aggregated carrier.

Processing Strategy II: Divide Buffer Space Group According to the Bandwidth of Each Aggregated Carrier.

In its own buffer resource, the terminal equipment divides buffer space group of corresponding size for each aggregated carrier according to the bandwidths of each aggregated carrier corresponding to CA modes respectively, and divides corresponding buffer memory in each buffer space group according to the TB quantity on aggregated carrier.

Through such processing, buffer space group can be determined based on that of carrier bandwidth. The greater the bandwidth of aggregated carrier, the greater buffer space group allocated for terminal equipment.

Processing Strategy III: Divide Buffer Space Group Based on the Bandwidth and Transmission Mode of Aggregated Carrier.

In its own buffer resource, the terminal equipment divides buffer space group of corresponding size for each aggregated carrier according to the bandwidth size of each aggregated carrier corresponding to CA mode and the quantity of codeword corresponding to transmission mode of each aggregated carrier respectively, and divides each buffer space group into relevant buffer space according to the number of the TBs on the aggregated carrier.

Processing Strategy IV: Divide Buffer Space Group Averagely Based on the Quantity of Maximum Aggregated Carrier Supported.

The terminal equipment divides buffer space group of the same size for all aggregated carriers corresponding to CA mode in its own buffer resource and divides each buffer space group into relevant buffer space according to the number of the TBs on the aggregated carrier.

Processing Strategy V: Divide Buffer Space Group Averagely According to the Quantity of Aggregated Carrier and the Preset Carrier Buffer Space Constant.

In its own buffer resource, the terminal equipment divides the total buffer resource averagely based on the quantity of carriers currently aggregated, and determines whether the averagely divided resource is greater than the preset carrier buffer space constant which refers to the buffer space length supported by the terminal equipment in LTE Rel-8 system. If it is bigger, the buffer resource divided based on the preset carrier buffer space constant shall be used respectively as buffer space group of each aggregated carrier corresponding to the CA mode; if not, the total buffer resource divided averagely according to the quantity of carrier currently aggregated shall be used as all aggregated carriers corresponding to the CA mode respectively to divide buffer space group of the same size. Then corresponding buffer space is divided in each buffer space group according to the TB quantity on aggregated carrier.

After buffer space group is divided through the above processing strategy, buffer space needs to be further divided therein. In each buffer space group, buffer space is divided averagely, while in all buffer space groups, the quantity of averagely divided buffer space shall be determined as per the rules below:

The terminal equipment judges whether the maximum quantity of downlink HARQ process conducted on all aggregated carriers is greater than the preset space constant;

If yes, the terminal equipment averagely divides the buffer space groups corresponding to aggregated carrier into relevant number of buffer space based on preset space constant and the codeword quantity corresponding to transmission mode on corresponding aggregated carrier;

If not, the terminal equipment averagely divides the buffer space groups corresponding to aggregated carrier into relevant number of buffer space based on the maximum quantity of downlink HARQ process conducted on corresponding aggregated carrier and the codeword quantity corresponding to transmission mode on aggregated carrier.

Based on the aforesaid treatment, terminal equipment establishes corresponding buffer space. When receiving signal transmission under CA form, the specific processing procedure is shown as below:

When the TB quantity on aggregated carrier sent by network side equipment according to CA mode received by terminal equipment is not greater than the quantity of buffer space divided for aggregated carrier by terminal equipment in buffer space group, the terminal equipment stores the information carried on the TB with decoding failure on aggregated carrier in all buffer spaces of buffer space groups respectively;

When the TB quantity on aggregated carrier sent by network side equipment according to CA mode received by terminal equipment is greater than the quantity of buffer space divided for aggregated carrier by terminal equipment in buffer space group, the terminal equipment stores the information carried on TBs of corresponding quantity on aggregated carrier in all buffer spaces of buffer space groups respectively, and abandons the information carried on other TBs exceeding the quantity of buffer space on aggregated carrier.

Scheme II: Perform Unified Buffer Space Management on All Aggregated Carriers

In such scheme, it is unnecessary to allocate fixed storage region for each aggregated carrier in buffer resource of the terminal equipment. Instead, divide the storage region of buffer resource directly and store the information carried on each aggregated carrier directly in the storage space.

In actual application, the information of each aggregated carrier is carried by TB, therefore the storage process mentioned above is actually to store the information carried by the TB with decoding failure in aggregated carrier through all storage spaces.

In the embodiments of the present invention, the above storage space is named as buffer space, while in specific application, the changes of the names mentioned above will not influence the protection scope of the present invention.

It can be seen from the above explanation that for realizing the scheme, averagely divide the buffer resource into several buffer spaces, and then store the information carried on the TB with decoding failure on aggregated carrier through all buffer spaces.

As required by specific application scene, the division of buffer space in this scheme can be realized through the processing strategies below, with specific explanations as follows:

The terminal equipment judges whether the maximum quantity of downlink HARQ process conducted on all aggregated carriers is greater than the preset space constant;

If yes, the terminal equipment determines the quantity of buffer space corresponding to all aggregated carriers according to preset space constant and the codeword quantity corresponding to transmission mode on each aggregated carrier; if not, terminal equipment determines the quantity of buffer space corresponding to all aggregated carriers based on the maximum quantity of HARQ process conducted on all aggregated carriers and the codeword quantity corresponding to transmission mode;

Terminal equipment averagely divides its own buffer resource into corresponding quantity of buffer space according to the sum of buffer space corresponding to all aggregated carriers.

Based on the aforesaid treatment, terminal equipment establishes corresponding buffer space. When receiving signal transmission under CA form, the specific processing procedure is shown as below:

When the sum of TBs on all aggregated carriers sent by network side equipment according to CA mode received by terminal equipment is not greater than the quantity of buffer space divided by terminal equipment, the terminal equipment stores the information carried on the TB with decoding failure on aggregated carrier in all buffer spaces respectively;

When the sum of TBs on all aggregated carriers sent by network side equipment according to CA mode received by terminal equipment is greater than the quantity of buffer space divided by terminal equipment, the terminal equipment stores the information carried on TBs of corresponding quantity in all buffer spaces respectively, and abandons the information carried on other TBs exceeding the quantity of buffer space.

In actual application, to ensure the network side owns consistent buffer space with terminal equipment side, in the technical solutions of the embodiments of the present invention, the terminal equipment also needs to send its own buffer resource information to the network side equipment, thus enabling the network side equipment to determine corresponding configuration for buffer space based on this.

Figure 4:
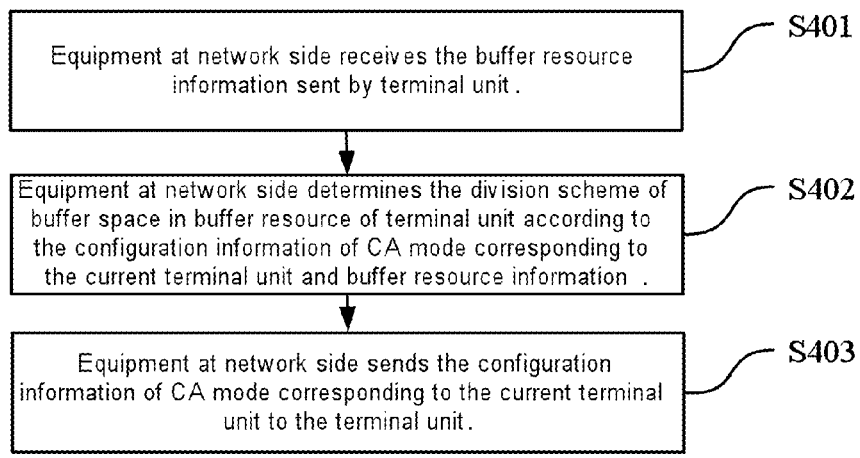
FIG. 4 is the flow diagram of a buffer space allocation method at the network side equipment provided in the embodiments of the present invention.

The above embodiments illustrate the procedure of realizing the method for allocating buffer space at terminal equipment side provided in the embodiments of the present invention; and accordingly, the embodiments of the present invention further provide the procedure of realizing such method at the equipment of network side, with the diagram shown in FIG. 4, comprising:

Step S401: Network side equipment receives the buffer resource information sent by terminal equipment.

Therein, configuration information in CA mode corresponding to terminal equipment at least comprises:

The number of carriers aggregated by terminal equipment;

Maximum number of aggregated carrier supported by terminal equipment;

Transmission mode on all aggregated carriers corresponding to terminal equipment;

Bandwidth of all aggregated carriers corresponding to terminal equipment;

Step S402: Network side equipment determines the division scheme of buffer space in buffer resource of terminal equipment according to the configuration information of CA mode corresponding to the current terminal equipment and buffer resource information.

In this step, for the buffer resource of a terminal equipment, corresponding method for dividing storage space is consistent with the explanations in step S302 mentioned above, which is not repeated here.

Step S403: Network side equipment sends the configuration information of CA mode corresponding to the current terminal equipment to the terminal equipment.

Compared with available technology, the embodiments of the present invention have the following advantages:

The solution of the present invention enables the division of the buffer space in the buffer resource of a terminal equipment according to the currently configured carrier aggregation mode of the terminal equipment, so that the number of buffer spaces in the buffer can be adjusted according to the number of aggregated carriers, thereby improving the utilization rate of the buffer resource. The method is simple, easy to implement, and applicable to both FDD and TDD systems.

The technical solution put forward by the embodiments of the present invention will be explained in combination with actual application scene.

First, the parameters below are defined for easy explanation:

$N_{soft}$: is the total size of buffer resource of terminal equipment;

$N_{carrier}$ represents the aggregated carrier quantity of terminal equipment, $N_{support} \geq N_{carrier}$;

$N_{support}$ refers to the maximum aggregated carrier quantity supported by terminal equipment;

$N_{Rel-8}$ is constant, which refers to the buffer space length supported by LTE Rel-8 terminal.

$K_{MIMO}(n_c)$ represents the codeword quantity corresponding to transmission mode of all aggregated carriers of terminal equipment. When terminal equipment configures on the $n_c^{th}$ carrier for multiple codeword transmission (viz. configures downlink transmission mode 3, 4, 8 and 9, or uplink transmission mode 2), $K_{MIMO}(n_c)=2$, or else, $K_{MIMO}(n_c)=1$.

$M_{DL\_HARQ}$ is the maximum quantity of DL HARQ conducted on each carrier.

$M_{limit}$ represents constant, whose value is 8.

$B(n_c)$ refers to the bandwidth of the $n_c^{th}$ carrier.

As the bandwidth of all carriers conducting CA is less than the maximum bandwidth supported by terminal equipment, the maximum size of TB (Transport Block) transmitted on each aggregated carrier is also less than the maximum bit support by terminal equipment. To make full use of buffer resource, HARQ processes storaged in buffer need to increase linearly along with aggregated carrier.

For easy description, the present invention supposes the following application scene for the embodiments below:

Supposing that the terminal equipment aggregates two carriers CC1 and CC2, in which CC1 has the bandwidth of 20 MHz and adopts multiple-codeword transmission mode; while CC2 has the bandwidth of 10 MHz and adopts single codeword transmission mode. And the maximum HARQ process number on each carrier is 8.

Corresponding to method I in the aforesaid step S302, the embodiments of the present invention provide the technical solution of all aggregated carriers conducting buffer management independently, and the TB on all carriers being stored in fixed regions of buffer.

For further corresponding to the five processing strategies in the aforesaid step S302, the technical solutions provided in embodiments of the present invention are explained below:

Scheme A: All Carriers Equally Divide the Total Buffer Size According to the Number of Carriers Aggregated.

First, the Buffer is divided into $N_{carrier}$ parts (viz. the buffer space group mentioned above) and each part corresponds to one carrier. Then independent buffer space is divided for each TB according to the transmission mode corresponding to all carriers and the HARQ process number within each part. Now the method of equal division shall be applied, viz. different carriers occupy the same buffer size and various TBs occupy the same buffer size in the same carrier.

The buffer size corresponding to TB on the $n_c^{th}$ carrier can be represented by the formula below:

$$N_{IR}(n_c) = \left\lfloor \frac{N_{soft}/N_{carrier}}{K_{MIMO}(n_c) \cdot \min(M_{DL\_HARQ}, M_{limit})} \right\rfloor$$

Figure 5:
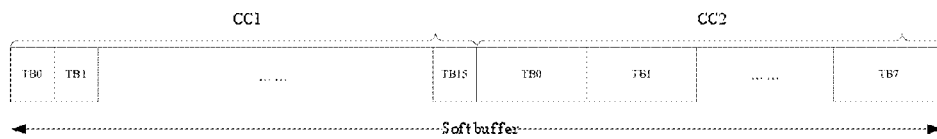
FIG. 5 is the diagram of implementation scene of a buffer space allocation method provided in the embodiments of the present invention.

For this scheme, the codeword quantity in CC1 is twice as that in CC2, while the total buffer size corresponding to CC1 and CC2 is same, therefore the buffer size corresponding to each TB on CC2 is half as that on CC1, as shown in FIG. 5.

Scheme B: All Carriers Divide the Buffer Size Proportionally Based on Bandwidth.

First, the Buffer is divided into $N_{carrier}$ parts (viz. the buffer space group mentioned above) and each part corresponds to one carrier. The buffer size corresponding to each part is related to the bandwidth of corresponding carrier. Then buffer is divided for each TB according to the transmission mode corresponding to all carriers and the HARQ process number within each part. Now the method of equal division shall be applied, viz. the buffer size occupied by different carriers is in linear proportion to carrier bandwidth and various TBs occupy the same buffer size in the same carrier.

The buffer size corresponding to TB on the $n_c^{th}$ carrier can be represented by the formula below:

$$N_{IR}(n_c) = \left\lfloor \frac{N_{soft} \cdot B(n_c)}{\sum_{i=0}^{N_{carrier}-1} B(i) \cdot K_{MIMO}(n_c) \cdot \min(M_{DL\_HARQ}, M_{limit})} \right\rfloor$$

Figure 6:
FIG. 6 is the diagram of implementation scene of a buffer space allocation method provided in the embodiments of the present invention.

For this scheme, the bandwidth of CC1 is twice as that of CC2, hence the buffer size corresponding to CC1 is twice as that of CC2, as shown in FIG. 6.

Scheme C: All Carriers Proportionally Divide the Buffer Size According to Bandwidth and the Codeword Quantity Transmitted.

First, the Buffer is divided into $N_{carrier}$ parts (viz. the buffer space group mentioned above) and each part corresponds to one carrier. The buffer size corresponding to each part is related to the bandwidth of corresponding carrier and the codeword quantity transmitted. Then buffer is divided for each TB according to the transmission mode corresponding to all carriers and the HARQ process number within each part. Now the method of equal division shall be applied, viz. the buffer size occupied by different carriers is in linear proportion to carrier bandwidth and codeword quantity, and various TBs occupy the same buffer size in the same carrier.

The buffer size corresponding to TB on the $n_c^{th}$ carrier can be represented by the formula below:

$$N_{IR}(n_c) = \left\lfloor \frac{N_{soft} \cdot B(n_c)}{\sum_{i=0}^{N_{carrier}-1} B(i) \cdot K_{MIMO}(i) \cdot \min(M_{DL\_HARQ}, M_{limit})} \right\rfloor$$

Figure 7:
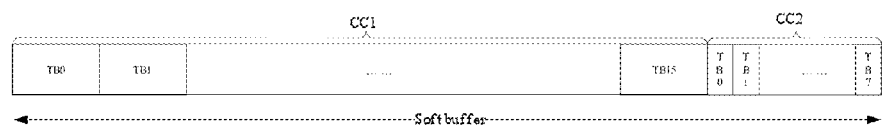
FIG. 7 is the diagram of implementation scene of a buffer space allocation method provided in the embodiments of the present invention.

For this scheme, the bandwidth of CC1 is twice as that of CC2, and its codeword quantity is twice as that of CC2, hence the buffer size corresponding to CC1 is four times as that of CC2, as shown in FIG. 7.

Corresponding to method II in aforesaid step S302, the embodiments of the present invention provide the technical solution of performing unified management on all carriers.

Buffer is divided into several parts averagely and each part corresponds to one TB. Therein, the quantity of the several divided parts is related to codeword quantity transmitted on all carriers and HARQ process number.

Buffer size corresponding to any TB can be represented by the formula below:

$$N_{IR} = \left\lfloor \frac{N_{soft}}{\sum_{j=0}^{N_{carrier}-1} K_{MIMO}(j) \cdot \min(M_{DL\_HARQ}, M_{limit})} \right\rfloor$$

Figure 8:
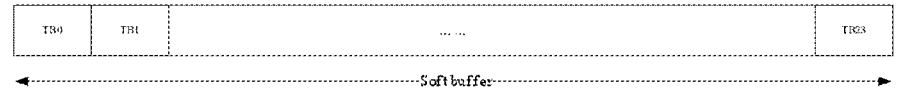
FIG. 8 is the diagram of implementation scene of a buffer space allocation method provided in the embodiments of the present invention.

For this scheme, buffer will be divided into 24 parts equally and each part corresponds to one TB. TB on each carrier will be stored mixedly in buffer, as shown in FIG. 8.

Scheme D: All Carriers Equally Divide the Total Buffer Size According to the Quantity of Maximum Aggregated Carriers.

First, the Buffer is divided into $N_{support}$ parts (viz. the buffer space group mentioned above) and each part corresponds to one carrier. Then independent buffer space is divided for each TB according to the transmission mode corresponding to all carriers and the HARQ process number within each part. Now the method of equal division shall be applied, viz. different carriers occupy the same buffer size and various TBs occupy the same buffer size in the same carrier.

The buffer size corresponding to TB on the $n_c^{th}$ carrier can be represented by the formula below:

$$N_{IR}(n_c) = \left\lfloor \frac{N_{soft}/N_{support}}{K_{MIMO}(n_c) \cdot \min(M_{DL\_HARQ}, M_{limit})} \right\rfloor$$

Figure 9:
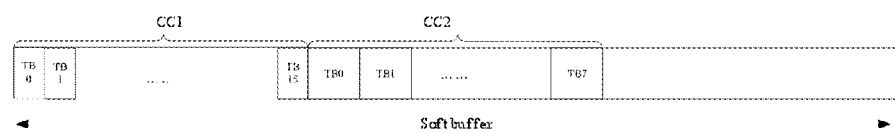
FIG. 9 is the diagram of implementation scene of a buffer space allocation method provided in the embodiments of the present invention.

For this scheme, codeword quantity in CC1 is twice as that of CC2 while the total buffer size corresponding to CC1 and CC2 is same, hence the buffer size corresponding to each TB on CC2 is half as that on CC1, as shown in FIG. 9. Therein, terminal equipment can support three aggregated carriers at most, and base station configures the terminal equipment to use two aggregated carriers for data transmission currently.

Scheme E: All Carriers Equally Divide the Total Buffer Size According to the Quantity of Carriers Currently Aggregated and the Preset Carrier Buffer Space Constant.

First, calculate the size N' of each part after Buffer is divided into $N_{carrier}$ parts equally, compare the N' with the preset carrier buffer space constant, select the smaller value as the buffer length corresponding to each carrier, and divide buffer space group for each carrier in the buffer based on the length. Then divide independent buffer space for each TB according to the transmission mode corresponding to all carriers and the HARQ process number within each buffer space group. Now the method of equal division shall be applied, viz. different carriers occupy the same buffer size and various TBs occupy the same buffer size in the same carrier.

The buffer size corresponding to TB on the $n_c^{th}$ carrier can be represented by the formula below:

$$N_{IR}(n_c) = \left\lfloor \frac{\min(N_{Rel-8}, N_{soft}/N_{carrier})}{K_{MIMO}(n_c) \cdot \min(M_{DL\_HARQ}, M_{limit})} \right\rfloor$$

Figure 10:
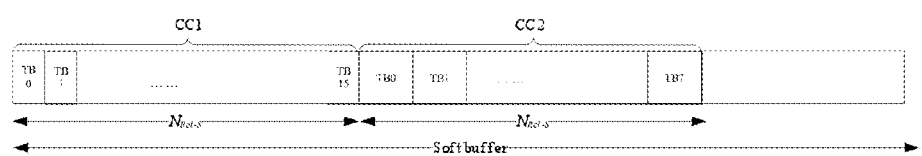
FIG. 10 is the diagram of implementation scene of a buffer space allocation method provided in the embodiments of the present invention.

For this scheme, codeword quantity in CC1 is twice as that of CC2 while the total buffer size corresponding to CC1 and CC2 is same, hence the buffer size corresponding to each TB on CC2 is half as that on CC1, as shown in FIG. 10. Therein, terminal equipment uses two aggregated carriers for data transmission, and $N_{Rel-8} < N_{soft}/N_{carrier}$.

It should be noted that in the technical solution provided in the embodiments of the present invention, if a TB is composed of several code blocks, the aforementioned buffer space can be further divided into corresponding quantity of sub buffer spaces. Furthermore, terminal equipment can store the corresponding code block of the TB through all sub buffer spaces.

Compared with available technology, the embodiments of the present invention have the following advantages:

The solution of the present invention enables the division of the buffer space in the buffer resource of a terminal equipment according to the currently configured carrier aggregation mode of the terminal equipment, so that the number of buffer spaces in the buffer can be adjusted according to the number of aggregated carriers, thereby improving the utilization rate of the buffer resource. The method is simple, easy to implement, and applicable to both FDD and TDD systems.

Figure 11:
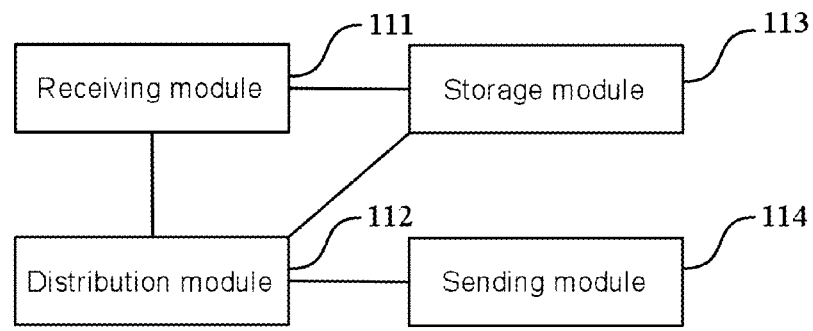
FIG. 11 is the structural diagram of terminal equipment provided in the embodiments of the present invention.

To realize the technical solution in the embodiments of the present invention, a kind of terminal equipment is also provided, with the structural diagram shown in FIG. 11, which comprises:

Receiving module 111 for receiving the configuration information of the current CA mode configured by the network side equipment and the aggregated carrier sent by network side equipment according to CA mode;

Distribution module 112 for dividing its own buffer resource into corresponding quantity of buffer space according to the configuration information of current CA mode;

Storage module 113 for storing the information carried on the TB with decoding failure on the aggregated carrier sent by network side equipment according to CA mode received by receiving module 111 through all buffer spaces divided by distribution module 112.

Furthermore, the terminal equipment also comprises sending module 114, used for sending the buffer resource information of terminal equipment to the network side equipment.

Therein, the configuration information of the current CA mode configured by the network side equipment which is received by receiving module 111 at least comprises:

The number of carriers aggregated by terminal equipment;

Maximum number of aggregated carrier supported by terminal equipment;

Transmission mode on all aggregated carriers corresponding to terminal equipment;

Bandwidth of all aggregated carriers corresponding to terminal equipment;

Further, distribution module 112 is specifically applied in the following two scenes:

Scene A: In the buffer resource of terminal equipment, corresponding buffer space groups are divided for all aggregated carriers corresponding to CA modes respectively, and corresponding buffer spaces are divided each buffer space group into relevant buffer space according to the number of the TBs on the aggregated carrier.

Figure 12:
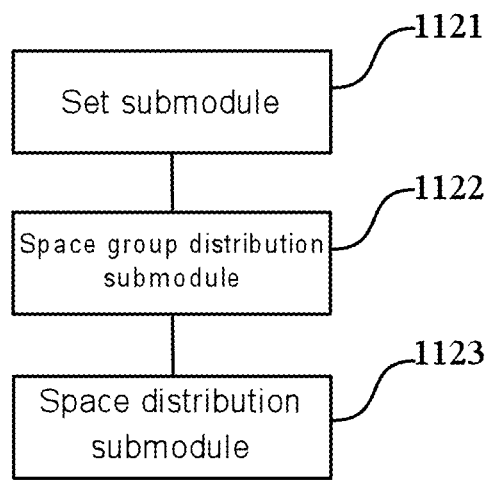
FIG. 12 is the structural diagram of the module in a terminal equipment provided in the embodiments of the present invention.

Under such scene, as shown in FIG. 12, distribution module 112 specifically comprises:

Set submodule 1121 for setting buffer space group division strategy;

Space group division submodule 1122 for dividing buffer space for all aggregated carriers in buffer resource of terminal equipment according to the buffer space group division strategy set by set submodule 1121;

Space division submodule 1123 for dividing each buffer space group into relevant buffer space according to the number of the TBs on the aggregated carrier;

Therein, buffer space group division strategy specially comprises that dividing the same size of buffer space group for each aggregated carrier, or dividing corresponding size of buffer space group for each aggregated carrier based on bandwidth of all aggregated carriers, or dividing corresponding size of buffer space group for all aggregated carriers in accordance with bandwidth of all aggregated carriers and the codeword quantity corresponding to the transmission mode.

Furthermore, set submodule 1121 is also used for setting the method of dividing buffer space group of the same size for all aggregated carriers;

Therein, the method for dividing the same size of buffer space group for all aggregated carriers comprises dividing total buffer resource averagely according to current aggregated carrier quantity, or dividing the total buffer resource averagely based on the maximum aggregated carrier quantity supported, or dividing the total buffer resource averagely according to current aggregated carrier quantity, and determine whether the resource divided averagely is greater than the preset carrier buffer space constant. If yes, buffer resource divided according to the preset carrier buffer space constant is used to respectively be buffer space group of each aggregated carrier corresponding to the CA mode; if not, the total buffer resource divided averagely according to the current carrier quantity aggregated is used to be the buffer space group of the same size divided of all aggregated carriers corresponding to the carrier aggregation mode, wherein the preset carrier buffer space constant is the buffer space length supported by LTE Rel-8 terminal equipment.

Further, set submodule 1121 is also used for setting space constant;

Space division submodule 1123 is specifically used for comparing the maximum quantity of downlink HARQ process conducted on all aggregated carriers with the space constant set by set submodule 1121, and averagely dividing the buffer space group divided for aggregated carriers by space group division submodule 1122 into corresponding quantity of buffer spaces based on the minimum value thereof and the codeword quantity corresponding to transmission mode on corresponding aggregated carriers.

Accordingly, storage module 113 is specifically used to:

When the TB quantity on aggregated carrier sent by network side equipment according to CA mode received by receiving module 111 is not greater than the quantity of buffer space in buffer space group divided for aggregated carrier by distribution module 112, the information carried on the TB with decoding failure on aggregated carrier are stored in all buffer spaces of buffer space groups divided for aggregated carrier by distribution module 112 respectively;

When the TB quantity on aggregated carrier sent by network side equipment according to CA mode received by receiving module 111 is greater than the quantity of buffer space in buffer space group divided for aggregated carrier by distribution module 112, the information carried on corresponding TB quantity on aggregated carrier are stored in all buffer spaces of buffer space groups divided for aggregated carrier by distribution module 112 respectively, and abandons the information carried on other TBs exceeding the quantity of buffer space on aggregated carrier.

Scene B: In the buffer resource of terminal equipment, corresponding buffer spaces are divided in accordance with the TB quantity on all aggregated carriers corresponding CA mode.

Figure 13:
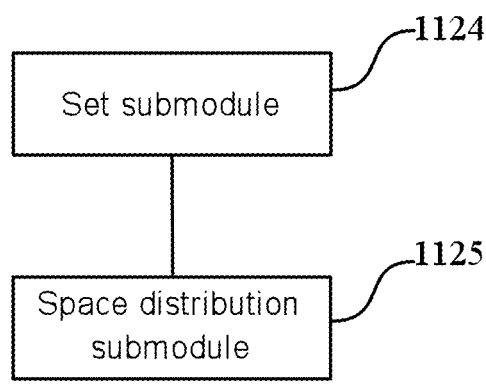
FIG. 13 is the structural diagram of the module in a terminal equipment provided in the embodiments of the present invention.

Under such scene, as shown in FIG. 13, distribution module 112 specifically comprises:

A set submodule 1124 for setting space constant;

Space division submodule 1125 for comparing the maximum quantity of downlink HARQ process conducted on all aggregated carriers and the space constant set by set submodule 1124, determining quantity of buffer space corresponding to all aggregated carriers based on the minimum value thereof and the codeword quantity corresponding to transmission mode on corresponding aggregated carriers, and averagely dividing buffer resource of the terminal equipment into buffer space of corresponding quantity based on the sum of buffer space corresponding to all aggregated carriers.

Accordingly, storage module 113 is specifically used to:

When the sum of TBs on aggregated carrier sent by network side equipment according to CA mode received by receiving module 111 is not greater than the quantity of buffer space divided by distribution module 112, the information carried on the TB with decoding failure on all aggregated carriers are stored in all buffer spaces divided by distribution module 112 respectively;

When the sum of TBs on aggregated carrier sent by network side equipment according to CA mode received by receiving module 111 is greater than the quantity of buffer space divided by distribution module 112, the information carried on corresponding TB quantity are stored in all buffer spaces divided by distribution module 112 respectively, and abandons the information carried on other TBs exceeding the quantity of buffer space.

Figure 14:
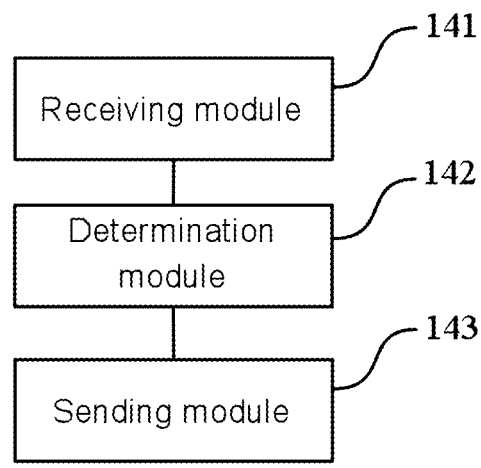
FIG. 14 is the structural diagram of an network side equipment provided in the embodiments of the present invention.

In a further aspect, the embodiments of the present invention also provide a kind of network side equipment, with the structural diagram shown in FIG. 14, which comprises:

A receiving module 141 for receiving buffer resource information sent by terminal equipment;

Determination module 142 for determining the buffer space division scheme in buffer resource of terminal equipment according to the configuration information of CA mode corresponding to the current terminal equipment and the buffer resource information received by receiving module 141.

Furthermore, the network side equipment also comprises sending module 143 for sending the configuration information of CA mode corresponding to the current terminal equipment to the terminal equipment;

Therein, configuration information in carrier aggregation mode corresponding to terminal equipment at least comprises:

The number of carriers aggregated by terminal equipment;

Maximum number of aggregated carrier supported by terminal equipment;

Transmission mode on all aggregated carriers corresponding to terminal equipment;

Bandwidth of all aggregated carriers corresponding to terminal equipment;

In specific application scene, the buffer space division scheme in buffer resource of terminal equipment determined by determination module 142 comprises:

Scheme I: In the Buffer Resource of Terminal Equipment, Corresponding Buffer Space Groups are Divided for All Aggregated Carriers Corresponding to CA Modes Respectively, and Corresponding Buffer Spaces are Divided Each Buffer Space Group into Relevant Buffer Space According to the Number of the TBs on the Aggregated Carrier.

Figure 15:
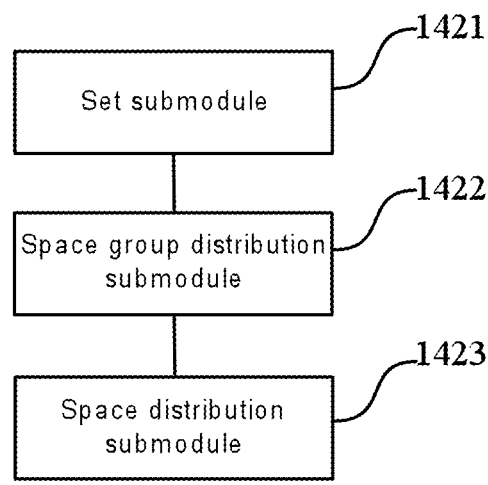
FIG. 15 is the structural diagram of the module in an network side equipment provided in the embodiments of the present invention.

For this scheme, as shown in FIG. 15, determination module 142 specifically comprises:

Set submodule 1421 for setting buffer space group division strategy;

Space group division submodule 1422 for dividing buffer space group for all aggregated carriers in the buffer resource of terminal equipment according to the buffer space group division strategy set by set submodule 1421;

Space division submodule 1423 for dividing corresponding buffer space in all buffer memory groups based on the TB quantity on aggregated carriers;

Therein, buffer space group division strategy specially comprises dividing the same size of buffer space group for each aggregated carrier, or dividing corresponding size of buffer space group for each aggregated carrier based on bandwidth of all aggregated carriers, or dividing corresponding size of buffer space group for all aggregated carriers in accordance with bandwidth of all aggregated carriers and the codeword quantity corresponding to the transmission mode.

Furthermore, set submodule 1421 is also used for setting the method of dividing buffer spaces of the same size for all aggregated carriers;

Therein, the method for dividing same size of buffer space group for all aggregated carriers comprises that dividing total buffer resource averagely according to current aggregated carrier quantity, or dividing the total buffer resource averagely based on the maximum aggregated carrier quantity supported, or dividing the total buffer resource averagely according to current aggregated carrier quantity, and determining whether the resource divided averagely is greater than the preset carrier buffer space constant. If yes, buffer resource divided according to the preset carrier buffer space constant is used to respectively be buffer space group of each aggregated carrier corresponding to the carrier aggregation mode; if not, the total buffer resource divided averagely according to the current carrier quantity aggregated is used to be the buffer space group of the same size divided of all aggregated carriers corresponding to the carrier aggregation mode, wherein the preset carrier buffer space constant is the buffer space length supported by LTE Rel-8 terminal equipment.

Furthermore, set submodule 1421 is also used for setting space constant;

Space division submodule 1423 is specifically used for comparing the maximum quantity of downlink HARQ process conducted on all aggregated carriers and the space constant set by set submodule 1421, and averagely dividing the buffer space group divided for aggregated carriers by space group division submodule 1422 into corresponding quantity of buffer spaces based on the minimum value thereof and the codeword quantity corresponding to transmission mode on corresponding aggregated carriers.

Scheme II: In the Buffer Resource of Terminal Equipment, Corresponding Buffer Space is Divided According to the TB Quantity on Aggregated Carriers Corresponding to CA Mode.

Figure 16:
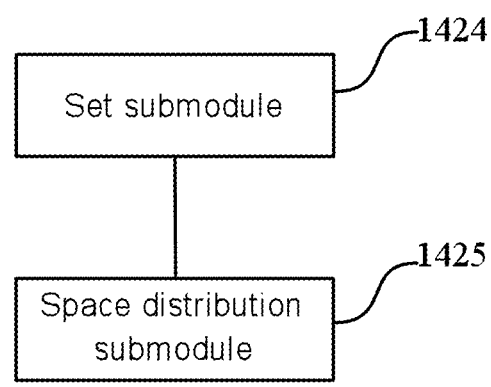
FIG. 16 is the structural diagram of the module in an network side equipment provided in the embodiments of the present invention.

For this scheme, as shown in FIG. 16, determination module 142 specifically comprises:

A set submodule 1424 for setting space constant;

Space division submodule 1425 is specifically used for comparing the maximum quantity of downlink HARQ process conducted on all aggregated carriers and the space constant set by set submodule 1424, determining quantity of buffer space corresponding to all aggregated carriers according to the minimum valve thereof and the codeword quantity corresponding to transmission mode on corresponding aggregated carrier, and dividing buffer resource of the terminal equipment into buffer space of corresponding quantity averagely based on the sum of buffer space corresponding to all aggregated carriers.

Compared with available technology, the embodiments of the present invention have the following advantages:

The technical solution of the present invention enables the division of the buffer space in the buffer resource of a terminal equipment according to the currently configured carrier aggregation mode of the terminal equipment, so that the number of buffer spaces in the buffer can be adjusted according to the number of aggregated carriers, thereby improving the utilization rate of the buffer resource. The method is simple, easy to implement, and applicable to both FDD and TDD systems.

With the description of the preferred embodiments hereinabove, those skilled in the art can clearly understand that the present invention can be realized with the aid of hardware, or the aid of software and necessary commonly used hardware platforms as well. Based on this understanding, the technical proposal of the present invention can be reflected in the form of a software product, which is stored in a nonvolatile memory medium (which could be CD-ROM, USB flash disk, mobile HDD, etc.) comprising instructions to enable a computer equipment, which could be a personal computer, a server or a network device, to carry out the methods in each application scene of the embodiment of the present invention.

Technical personnel of the field can understand that the attached drawings only refer to the diagram of a preferred embodiment, and the module or procedure therein is unnecessary for the implementation of the embodiments of the present invention.

Technical personnel of the field can understand that modules of the units in implementation scene can be distributed in the units of implementation scenes according to implementation scene descriptions, or located in one or more units different from this implementation scene through corresponding changes. Modules in the implementation scenes mentioned above can be merged into one module, or further divided into many submodules.

The number of the aforementioned embodiments of the present invention is only used for description rather than representing advantages or disadvantages of implementation scenes.

Only several specific implementation scenes of the embodiments of the present invention are disclosed above. However, the present invention is not only limited to those. Any change that technical personnel of the field can predict shall be protected by the present invention.

The invention claimed is:

1. A buffer space allocation method which comprises:
    terminal equipment receives configuration information of a current carrier aggregation (CA) mode configured by network side equipment;
    the terminal equipment divides its own buffer resource into a relevant number of buffer spaces according to the configuration information of the current CA mode, and each buffer space stores information carried by a transport block (TB) with decoding failure sent by the network side equipment according to the CA mode on an aggregated carrier;
    wherein,
    the configuration information of CA mode at least comprises one or more of the following:
    number of carriers aggregated by the terminal equipment;
    maximum number of aggregated carriers supported by the terminal equipment,
    transmission mode of each aggregated carrier corresponding to the terminal equipment;
    bandwidth of each aggregated carrier corresponding to the terminal equipment.

2. The method as claimed in claim 1, wherein the terminal equipment divides its own buffer resource into a relevant number of buffer spaces according to the configuration information of the current CA mode, including:
    the terminal equipment divides relevant buffer space groups for all aggregated carriers corresponding to the CA mode in its own buffer resource respectively, and divides each buffer space group into relevant buffer spaces according to the number of the TBs on the aggregated carrier; or,
    the terminal equipment divides the relevant buffer space according to the number of TBs on all aggregated carriers corresponding to the CA mode in its own buffer resource.

3. The method as claimed in claim 2, wherein the terminal equipment divides relevant buffer space groups for all aggregated carriers corresponding to the CA mode in its own buffer resource respectively, and divides each buffer space group into relevant buffer spaces according to the number of TBs on the aggregated carrier, which comprises:
    the terminal equipment divides buffer space groups with the same size for all aggregated carriers corresponding to the CA mode in its own buffer resource respectively, and divides each buffer space group into relevant buffer space according to the number of TBs on the aggregated carrier; or,
    the terminal equipment divides buffer space groups with relevant size for all aggregated carriers corresponding to the CA mode in its own buffer resource respectively, according to the bandwidth of each aggregated carrier, and divides each buffer space group into relevant buffer space according to the number of the TBs on the aggregated carrier; or,
    the terminal equipment divides buffer space groups with relevant size for all aggregated carriers corresponding to the CA mode in its own buffer resource respectively, according to the bandwidth of each aggregated carrier and the number of code words referring to the transmission mode on each aggregated carrier, and divides each buffer space group into relevant buffer spaces according to the number of TBs on the aggregated carrier.

4. The method as claimed in claim 3, wherein the terminal equipment divides buffer space groups with the same size for all aggregated carriers corresponding to the CA mode in its own buffer resource respectively, which comprises:
    the terminal equipment divides the total buffer resource average according to the number of aggregated carriers, and buffer space groups with the same size are divided for all aggregated carriers corresponding to the CA mode respectively; or,
    the terminal equipment divides the total buffer resource average according to the maximum number of aggregated carriers supported by the terminal equipment, and buffer space groups with the same size are divided for all aggregated carriers corresponding to the CA mode respectively; or,
    the terminal equipment divides the total buffer resource average according to the number of aggregated carriers, and determines whether the size of the average divided resource is greater than the preset carrier buffer space constant, if yes, the preset carrier buffer space constant is used as the size of buffer space group, and the buffer space groups with the same size are divided for all aggregated carriers corresponding to the CA mode respectively; if not, the total buffer resource is divided on average according to the number of aggregated carriers, and the buffer space groups with the same size are divided for all aggregated carriers corresponding to the CA mode respectively.

5. The method as claimed in claim 4, wherein the preset carrier buffer space constant is the buffer space length supported by the terminal equipment in LTE Rel-8 system.

6. The method as claimed in claim 3, wherein the terminal equipment divides each buffer space group into relevant buffer spaces according to the number of TBs on the aggregated carrier, which comprises:

the terminal equipment judges whether the maximum number of downlink HARQ processes on each aggregated carrier is greater than the preset space constant;

if yes, the terminal equipment average divides the buffer space group corresponding to the aggregated carrier into a relevant number of buffer spaces according to the preset space constant and the number of code words referring to a transmission mode on a corresponding aggregated carrier;

if not, the terminal equipment average divides the buffer space group corresponding to the aggregated carrier into a relevant number of buffer spaces based on the maximum number of downlink HARQ processes on a corresponding aggregated carrier and the number of code words referring to a transmission mode on the aggregated carrier.

7. The method as claimed in claim 2 wherein when the terminal equipment divides relevant buffer space groups for all aggregated carriers corresponding to the CA mode respectively, and divides relevant buffer space in each buffer space group according to the number of TBs on the aggregated carrier in its own buffer resource, and each buffer space stores the information carried by the TBs with decoding failure sent by the network side equipment on aggregated carrier according to the CA mode, which comprises:

when the number of TBs sent by the network side equipment on the aggregated carrier according to the CA mode and received by the terminal equipment is not greater than the number of buffer space in buffer space group divided for the aggregated carrier by the terminal equipment, the terminal equipment stores the information carried by each TB with decoding failure on the aggregated carrier in each buffer space in the buffer space group respectively;

when the number of TBs sent by the network side equipment on the aggregated carrier according to the CA mode and received by the terminal equipment is greater than the number of buffer spaces in a buffer space group divided for the aggregated carrier by the terminal equipment, the terminal equipment stores the information carried by the relevant number of TBs on the aggregated carrier in a buffer space in the buffer space group respectively, and drops the information carried by the other TBs exceeding the number of the buffer spaces on the aggregated carrier.

8. The method as claimed in claim 2, wherein the terminal equipment divides relevant buffer spaces in its own buffer resource according to the number of TBs on all aggregated carriers corresponding to the CA mode, which comprises:

the terminal equipment judges whether the maximum number of downlink HARQ processes on all aggregated carriers is greater than the preset space constant;

if yes, the terminal equipment determines the number of buffer spaces corresponding to each aggregated carrier according to the preset space constant and the number of code words referring to the transmission mode on each aggregated carrier; if not, the terminal equipment determines the number of buffer spaces according to the maximum number of downlink HARQ processes on each aggregated carrier and the number of code words referring to a transmission mode;

the terminal equipment average divides its own buffer resource into a relevant number of buffer spaces based on the sum of buffer spaces corresponding to all aggregated carriers.

9. The method as claimed in claim 2 wherein the terminal equipment divides relevant buffer space in its own buffer resource based on the number of TBs on all aggregated carriers corresponding to the CA mode, and each buffer space stores the information carried by the TB with decoding failure on aggregated carrier sent by the network side equipment according to CA mode, which comprises:

when the sum of the TBs on aggregated carrier sent by the network side equipment according to CA mode and received by the terminal equipment is not greater than the number of buffer spaces divided by the terminal equipment, the terminal equipment stores the information carried by each TB with a decoding failure in each buffer space on the aggregated carrier respectively;

when the sum of the TBs on an aggregated carrier sent by the network side equipment according to CA mode and received by the terminal equipment is greater than the number of buffer spaces divided by the terminal equipment, the terminal equipment stores the information carried by a relevant number of TBs with a decoding failure in the buffer space respectively, and drops the information carried by the other TBs exceeding the number of the buffer spaces.

10. The method as claimed in claim 1, also comprises:
the terminal equipment sends its own buffer resource information to the network side equipment.

11. A buffer allocation method, which comprises:
network side equipment receives buffer resource information sent by terminal equipment;
network side equipment determines the scheme for dividing buffer space in a buffer resource of the terminal equipment according to the configuration information of a carrier aggregation (CA) mode and the buffer resource information corresponding to current terminal equipment, wherein, the configuration information of the CA mode corresponding to the terminal equipment at least comprises one or multiples of:

number of carriers aggregated by the terminal equipment;
the maximum number of aggregated carriers supported by the terminal equipment,
the transmission mode on each aggregated carrier corresponding to the terminal equipment;
the bandwidth of each aggregated carrier corresponding to the terminal equipment.

12. The method as claimed in claim 11, wherein the network side equipment determines the scheme for dividing buffer space in a buffer resource of the terminal equipment according to the configuration information of the CA mode and the buffer resource information corresponding to the current terminal equipment, including:

in a buffer resource of the terminal equipment, relevant buffer space groups for all aggregated carriers corresponding to the CA mode are divided respectively, and each buffer space group is divided into a relevant buffer space according to the number of transport blocks (TBs) on the aggregated carrier; or, in a buffer resource of the terminal equipment, relevant buffer space is divided according to the number of TBs on all aggregated carriers corresponding to the CA mode.

13. The method as claimed in claim 12, wherein in a buffer resource of the terminal equipment, relevant buffer space groups for all aggregated carriers corresponding to the CA mode are divided respectively, and each buffer space group is divided into relevant buffer space according to the number of the TBs on the aggregated carrier, which comprises;

in the buffer resource of the terminal equipment, buffer space groups with the same size for all aggregated carriers corresponding to the CA mode are divided respectively, and each buffer space group is divided into relevant buffer spaces according to the number of TBs on the aggregated carrier; or, in the buffer resource of the terminal equipment, buffer space groups with relevant size for all aggregated carriers corresponding to the CA mode in its own buffer resource are divided respectively, according to the bandwidth of each aggregated carrier, and each buffer space group is divided into relevant buffer spaces according to the number of TBs on the aggregated carrier; or, in buffer resource of the terminal equipment, buffer space groups with relevant size for all aggregated carriers corresponding to the CA mode in its own buffer resource are divided respectively, according to the bandwidth of each aggregated carrier and the number of code words referring to the transmission mode on each aggregated carrier, and each buffer space group is divided into relevant buffer spaces according to the number of TBs on the aggregated carrier.

14. The method as claimed in claim 13, wherein in the buffer resource of the terminal equipment, buffer space groups with the same size for all aggregated carriers corresponding to the CA mode are divided respectively, which comprises:

the terminal equipment divides the total buffer resource average according to the number of aggregated carriers, and the buffer space groups with the same size are divided for each aggregated carrier corresponding to the CA mode respectively; or, the terminal equipment divides the total buffer resource average according to the maximum number of aggregated carriers supported by the terminal equipment, and the buffer space groups with the same size are divided for each aggregated carrier corresponding to the CA mode respectively; or, the terminal equipment divides the total buffer resource average according to the number of aggregated carriers, and determines whether the size of average divided resource is greater than the preset carrier buffer space constant, if yes, the preset carrier buffer space constant is used as the size of a buffer space group, and the buffer space groups with the same size are divided for each aggregated carrier corresponding to the CA mode respectively; if not, the total buffer resource average according to the number of aggregated carriers, and the buffer space groups with the same size are divided for each aggregated carrier corresponding to the CA mode respectively.

15. The method as claimed in claim 14, wherein the preset carrier buffer space constant specifically refers to the buffer space length supported by terminal equipment in LTE Rel-8 system.

16. The method as claimed in claim 13, wherein each buffer space group is divided into a relevant buffer space according to the number of the TBs on the aggregated carrier, which comprises:

the network side equipment judges whether the maximum number of downlink HARQ processes on each aggregated carrier corresponding to the terminal equipment is greater than the preset space constant;

if yes, the network side equipment average divides the buffer space group corresponding to the aggregated carrier in buffer resource of terminal equipment into a relevant number of buffer spaces according to the preset space constant and the number of code words referring to transmission mode on a corresponding aggregated carrier of the terminal equipment;

if not, the network side equipment average divides the buffer space group corresponding to the aggregated carrier in a buffer resource of terminal equipment into a relevant number of buffer spaces based on the maximum number of downlink HARQ processes on a corresponding aggregated carrier of the terminal equipment and the number of code words referring to a transmission mode on the aggregated carrier.

17. The method as claimed in claim 12, wherein in a buffer resource of the terminal equipment, relevant buffer space is divided according to the number of TBs on each aggregated carrier corresponding to the CA mode, which comprises:

the network side equipment judges whether the maximum number of downlink HARQ processes on each aggregated carrier corresponding to the terminal equipment is greater than the preset space constant;

if yes, the network side equipment determines the number of buffer space corresponding to each aggregated carrier according to the preset space constant and the number of code words referring to a transmission mode on a corresponding aggregated carrier of the terminal equipment; if not, the network side equipment determines the number of buffer spaces corresponding to each aggregated carrier according to the maximum number of HARQ processes on the corresponding aggregated carrier of the terminal equipment and the number of code words referring to a transmission mode on the aggregated carrier;

the network side equipment average divides the buffer resource of the terminal equipment into a relevant number of buffer spaces according to the sum of buffer spaces corresponding to all aggregated carriers corresponding to the terminal equipment.

18. The method as claimed in claim 10, which also comprises:

the network side equipment sends the configuration information of the CA mode corresponding to the current terminal equipment.

* * * * *